(12) United States Patent
Gerigk et al.

(10) Patent No.: US 6,261,403 B1
(45) Date of Patent: Jul. 17, 2001

(54) METHOD FOR PREVENTING BUBBLES OR SMALL BUBBLES WHEN CONNECTING SUBSTRATE PARTS OF OPTICAL DATA CARRIERS BY MEANS OF AN ADHESIVE

(75) Inventors: Reinhard Gerigk; Eggo Sichmann, both of Gelnhausen; Michael Muecke, Karben, all of (DE)

(73) Assignee: Singulus Technologies AG, Alzenau (DE)

( * ) Notice: Subject to any disclaimer, the term of this patent is extended or adjusted under 35 U.S.C. 154(b) by 0 days.

(21) Appl. No.: 09/433,351

(22) Filed: Nov. 4, 1999

(51) Int. Cl.$^7$ .................................................... B32B 31/24
(52) U.S. Cl. .................... 156/272.2; 156/272.6; 156/273.1; 427/458; 427/532
(58) Field of Search ............. 156/272.2, 272.6, 156/273.1, 275.7; 369/286; 427/457, 458, 532, 533, 535, 569

(56) References Cited

U.S. PATENT DOCUMENTS

| | | | |
|---|---|---|---|
| 5,982,740 | * | 11/1999 | Schwartz .............................. 369/286 |
| 6,004,420 | * | 12/1999 | Nakamura et al. .................. 156/249 |
| 6,013,145 | * | 1/2000 | Arno et al. .............................. 156/74 |
| 6,165,299 | * | 12/2000 | Guan et al. ............................ 156/74 |

FOREIGN PATENT DOCUMENTS 37 21 703   1/1989 (DE).
WO-8905477 * 6/1989 (WO).

OTHER PUBLICATIONS

Glasurit–Handbuck Lacke und Farben, Curt R. Vincentz Verlad, Hanover 1984, pp. 604–606.
J.W. Gerstenberg, "Loranatechnik in der Automobilindustrie," Metalloberflache 51 (12997) 4, pp. 240–242.
H. Gleich, "Verbesserung der Benetzungsfahigkeit durch Plasmabehandlung," Adhasion 1989, vol. 3 pp. 9–15.
Lexikon der Physik, 3rd ed., Franckh'sche Verlagshandlung Stuttgart, p. 849.
E. Prinz, "Neuere Erkenntnisse uber die Koronaentladung" Coating 1079, pp. 269–272.

* cited by examiner

Primary Examiner—Michael Ball
Assistant Examiner—John T. Haran
(74) Attorney, Agent, or Firm—Pillsbury Winthrop LLP

(57) ABSTRACT

A method of preventing bubbles or small bubbles when connecting substrate parts of optical data carriers by means of an adhesive. At least one of the substrate parts and/or the adhesive is provided with electric charges.

26 Claims, 2 Drawing Sheets

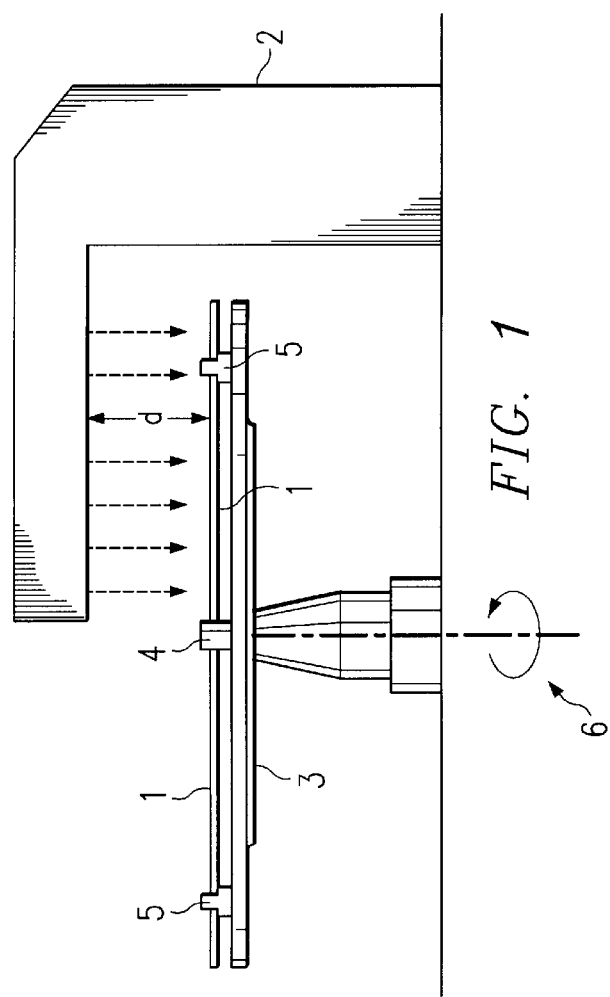
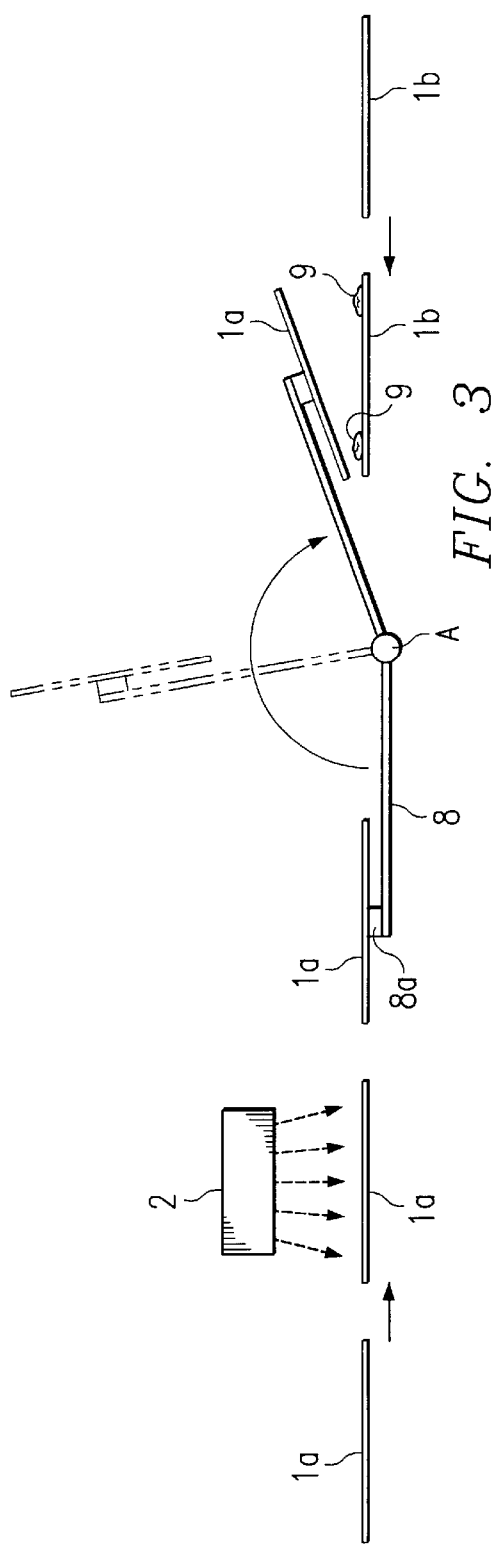

METHOD FOR PREVENTING BUBBLES OR SMALL BUBBLES WHEN CONNECTING SUBSTRATE PARTS OF OPTICAL DATA CARRIERS BY MEANS OF AN ADHESIVE

BACKGROUND OF THE INVENTION

The invention relates to a method of connecting substrate parts, in particular the two halves of a DVD (digital versatile disc) by means of an adhesive.

In DVDs, information which is stored in the form of very small elevations and pits in the surface of one DVD half is read out through the other DVD half as well as the adhesive layer between the two halves. Since the pits are very small, slight flaws in the adhesive layer in the form of small business may impair the reproduction of the information in the pits. Even if there is only a single small bubble in the adhesive layer, the DVD has to be considered defective. There may occur small bubbles even if the substrate part (DVD half) is uniformly coated with the adhesive. It has not been entirely clarified why these small bubbles occur. The small bubbles may be gas inclusions from the ambient atmosphere which are formed when pressing the two substrate parts against each other. There is also the possibility that they are formed in the adhesive by themselves. One reason therefor could be the gas evolution of solvents of the adhesive. Preferably, an adhesive having a specific viscosity is applied to the inner region of a substrate part in the form of a thick circumferential path and is flattened during the connection with the other substrate part, wherein excess adhesive is removed preferably by rapidly rotating the substrate part, i.e., the DVD. Other methods of applying the adhesive are, for instance, uniformly spraying it onto a rotating substrate part or injecting it into two convex substrate parts. In all known methods, the aforementioned small bubbles, which are detrimental to the reproduction of the data, may occur.

BRIEF SUMMARY OF THE INVENTION

An object of the invention is to overcome the aforementioned drawbacks and reliably prevent bubbles, and particularly small bubbles, from being present between the substrate parts after their connection by means of an adhesive.

The above and other objects are achieved by applying electric charges to one or the other part of an optical data carrier, or to an adhesive connecting the parts together. The optical data carrier may be, for example, a DVD.

It has surprisingly been found that the occurrence of small bubbles between two substrate parts after their connection by means of an adhesive can be prevented by the application of charges onto at least one substrate part and/or the adhesive before or after applying the adhesive to a substrate part.

Therefore, according to the present invention, the solution to this problem is based on the concept of applying electric charges to at least one of the substrate parts and/or the adhesive. This may be done before and/or after applying the adhesive and before and/or after connecting the two substrate parts. It is also possible to bond more than two substrate parts (halves) to each other to form a composite of optical data carriers. In this case, the method according to the invention is applied in each of the successive steps of bonding substrate parts to each other.

The advantages of the method according to the invention reside in ensuring a complete and faultless reproduction of the information stored in the pits of the DVD.

It is known per se from DE-A1-37 21 703 to provide work pieces, e.g., car bodies, having an electrically insulating surface with a uniform electrostatic charge prior to lacquering or enameling. Thus, it is possible to uniformly coat the surface with a lacquer or enamel layer. However, the problems occurring in the production of optical storage media, such as DVD, namely the formation of small bubbles, which impair the storage or the reproduction of the data, do not play a role in this state of the art.

In the following, the invention will be explained in more detail by means of the drawings.

BRIEF DESCRIPTION OF THE SEVERAL VIEWS OF THE DRAWING

FIG. 1 shows a side view of a device, in which the method according to the invention is used, FIG. 3 shows the method according to the invention in connection with the step of bonding two substrate parts to each other.

DETAILED DESCRIPTION OF THE INVENTION

Figure 2:
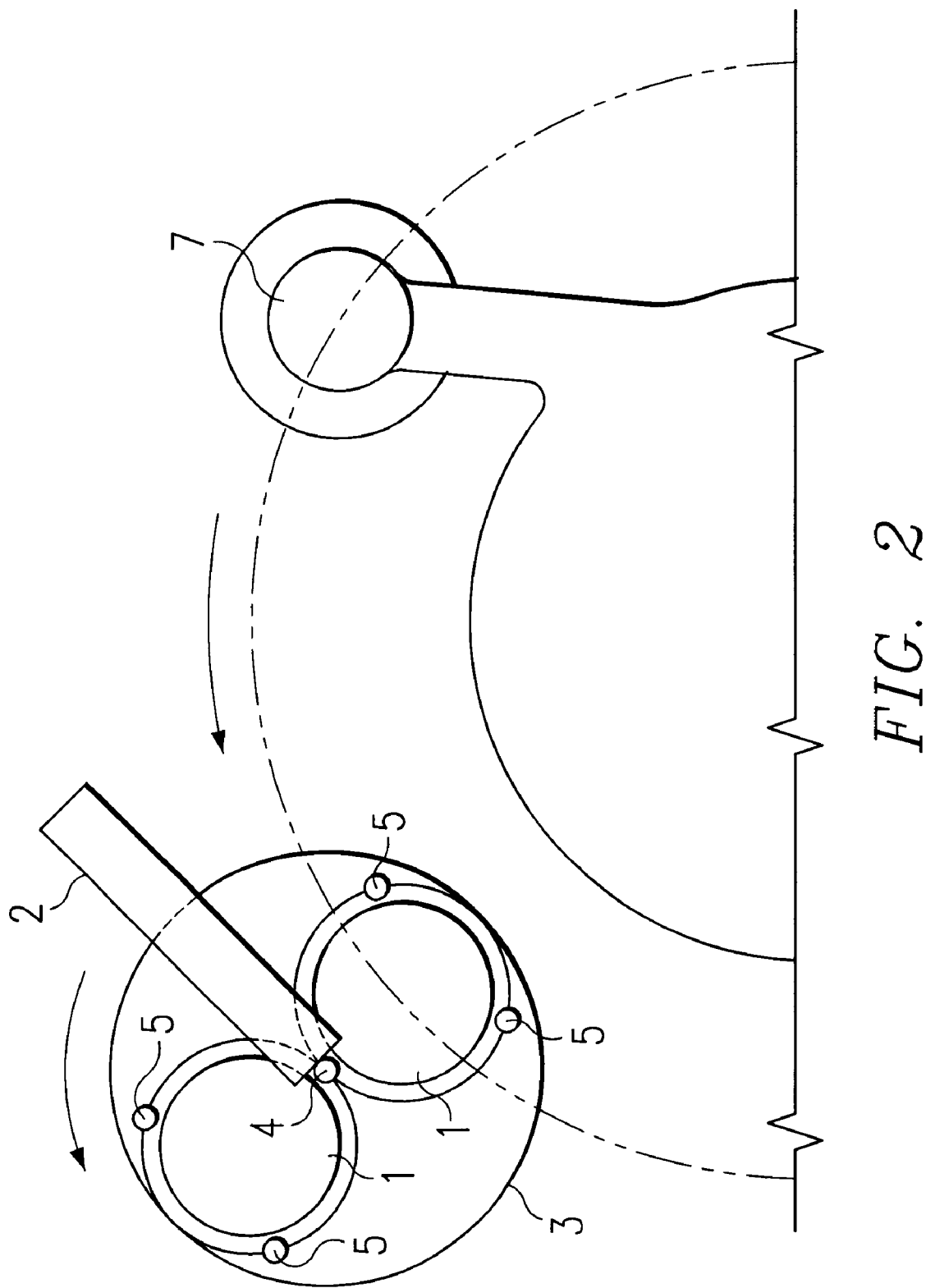
FIG. 2 shows a top view of the device according to FIG. 1.

According to the method of the invention, electric charges are applied to at least one substrate part. This may be done by forming charges by means of an electric field or by means of spraying electrons onto the substrate part (e.g., corona discharge).

However, it is also possible to achieve a separation of the charges on the substrate part by means of friction and thus to generate frictional electricity. Depending on the substrate material, the adhesive material, the temperature and/or the atmospheric humidity, the surface of the substrate part can be charged so as to have a predetermined charge distribution and a predetermined polarity. Substrate parts having a non-conductive surface are preferably positively charged. Metalized substrate parts—i.e., conductive substrate parts—may be charged both positively and negatively.

Preferably, the surface is charged so as to achieve a homogeneous charge distribution. However, the charge distribution may also be inhomogeneous, e.g., radially increasing or decreasing on the substrate part. Above all, the charge condition in that area of the substrate where the first contact with the adhesive occurs during the bonding step is important for the method of the invention to function properly. It is an intended effect of the method of the invention to prevent an electrostatic repulsion of the adhesive. It has been observed that without the method according to the invention an adhesive path applied to a substrate part was changed in its shape during the bonding step by the approaching other substrate part, possibly by electrostatic repulsion, i.e., the convex form of the bulge-like adhesive path obtained a concave indentation. Thus, cavities were formed when joining the substrate parts, which led to the detrimental formation of bubbles in the adhesive.

According to an advantageous further development of the method, the charges are applied during the production process such that, on the one hand, they yield sufficient effect and, on the other hand, the application of the charges can be incorporated in the process as easily as possible. It is, for instance, also possible to charge both substrate halves. Furthermore, the adhesive may be grounded or charged positively or negatively at its outlet nozzle. In this way, the adhesive can be applied to at least one substrate part in a charge-neutral or charged state.

FIG. 1 shows a device for applying the method according to the invention in the DVD production. Two DVD halves 1 are placed on a rotary table 3 comprising a drive 6, which halves are fixed on the rotary table in an electrically insulated manner in the center 4 of the rotary table 3 and by means of mountings 5 at the edge of the disks. However, it is also possible that only one DVD half or more than two DVD halves are arranged on the rotary table 3. A charging means 2 is arranged above the DVD halves 1 at a specific distance of e.g., 10 to 50 mm, preferably 30 mm. An electric field is applied, i.e., charges are transported between the charging means 2 and the DVD halves 1. The DVD halves are thus electrostatically charged or, if there are already charges on the halves, they are neutralized. The rotation of the rotary table effects a uniform distribution of the charges.

It can be recognized in the top view according to FIG. 2 that the DVD halves 1, which are mounted on the rotary table 3 and can be supplied and removed in a transport system via a gripper 7, rotate below the charging means 2. However, it is also possible in principle that the charging means 2 is moved over the substrates and the substrates are stationary. Preferably, one of the DVD halves is electrostatically charged and lowered onto the other DVD half which has already been coated with an adhesive in order to bond said halves to each other. However, it is also possible that charges are applied to both DVD halves before they are coated with an adhesive.

FIG. 3 shows a schematic representation of a production line which shows the method according to the invention in connection with the step of bonding two substrate parts. From the left side to the right side, substrate parts 1a are supplied and their surfaces are provided with charges by means of a charging device 2. The surface may be electrically charged, but also neutralized if there have already been electric charges on the surface of the substrate part. By means of a pivot arm 8 comprising a gripping means 8a, the substrate part 1a is taken at its lower side and rotated about an axis A so that the upper side faces downwards. Subsequently, the substrate part 1a is placed onto a substrate part 1b which is supplied from the right side and is covered with an adhesive 9. When said substrate part 1a is placed onto said substrate part 1b, the bulge-like adhesive path 9 is flattened and said parts are joined by means of the adhesive. FIG. 3 shows an embodiment of the method according to the invention, wherein only substrate part 1a, which is placed onto substrate part 1b being covered with the adhesive is charged. However, it is also possible that only substrate part 1b being covered with the adhesive is provided with charges, or that both substrate parts 1a and 1b are provided with charges. This can be done before or after the application of the adhesive. As an alternative, substrate part 1b may be charged on the rear side after the application of the adhesive 9. When charging the substrate part covered with adhesive, charges which are contained in the adhesive itself or are formed during the application step may be neutralized.

The thickness of substrate parts in the DVD production (0.6 mm) is small in comparison to the range of electrostatic forces. Therefore, the charges can also be applied to the rear side of the substrate parts, i.e., to that surface which subsequently does not come into contact with the adhesive.

It is furthermore possible that only the adhesive is provided with electric charges or grounded or that additionally charges are applied to at least one substrate part.

The application of charges to the substrate part or the substrate parts can be performed, as explained above, during the rotation of the substrate parts relatively to the charge electrode (charging means), during any kind of relative motion, e.g., linear motion or arc-shaped motion, but also during static positioning of the substrate parts relative to the charge electrode, wherein it must only be ensured that the entire desired surface of the substrate part is provided with the desired charge. If necessary, the position and the size of the charge electrode must be adapted to the size of the substrate.

The advantage of the method according to the invention consists in that bubbles or small bubbles, i.e., air/gas inclusions or cavities in the adhesive can be reliably prevented.

Apart from being used in the DVD production, the method according to the invention can also be used in other processes, in which plastics substrates, i.e., substrates which are easily electrostatically charged, are to be coated without bubbles. The method according to the invention can be used, for instance, in lacquering or enameling a substrate.

This application relates to subject matter disclosed in German Application number 198 50 832.8, filed on Nov. 4, 1998, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of preventing bubbles from being present between substrate parts of an optical data carrier, which substrate parts are connected together by means of an adhesive, said method comprising applying electric charges to at least one of the substrate parts or the adhesive.

2. The method according to claim 1, wherein before said step of applying, the adhesive has an electric charge with a first polarity, said step of applying electric charges is performed before or after the adhesive has been applied to the substrate parts, and the electric charges applied in said applying step have a polarity opposite to the first polarity.

3. The method according to claim 1, wherein before said step of applying, the adhesive has an electric charge with a first polarity, said step of applying electric charges is performed before or after the adhesive has been applied to the substrate parts, and the electric charges applied in said applying step have the first polarity.

4. The method according to claim 1, further comprising rendering the surface of at least one substrate part electrically neutral before or after the adhesive has been applied to the substrate parts.

5. The method according to claim 1, wherein the adhesive is positively or negatively electrically charged or uncharged.

6. The method according to claim 1, wherein said step of applying electric charges is performed by effecting electrostatic induction by means of an electric field.

7. The method according to claim 1, wherein said step of applying electric charges is performed by the charges are applied by means of spraying electrons onto the substrate part.

8. The method according to claim 7, wherein the spraying of electrons onto the substrate part is performed by means of corona discharge.

9. The method according to claim 1, wherein said step of applying electric charges is performed by effecting charge separation by means of friction.

10. The method according to claim 1, wherein said step of applying electric charges is performed by a charging means.

11. The method according to claim 10, wherein the charging means are arranged at a distance d of 10 to 50 mm from a substrate part.

12. The method according to claim 11, wherein the distance d is 30 mm.

13. The method according to claim 10, wherein the charging means and a substrate part are moved relative to each other during said step of applying electric charges.

14. The method according to claim 10, wherein a substrate part is rotated below the charging means and the charging means is stationary during said step of applying electric charges.

15. The method according to claim 10, wherein the charging means is moved over a substrate part and the substrate part is stationary during said step of applying electric charges.

16. The method according to claim 1, wherein said step of applying electric charges is performed to charge a substrate part to achieve a homogeneous charge distribution.

17. The method according to claim 1, wherein said step of applying electric charges is performed to charge a surface of a substrate part to achieve a charge distribution depending on at least one of: the substrate material; the adhesive material; the temperature; and the atmospheric humidity.

18. The method according to claim 1, wherein one of the substrate parts is coated with an adhesive before the substrate parts are connected together and said step of applying electric charges is performed by applying electric charges to the other one of the substrate parts before the substrate parts are connected together.

19. The method according to claim 1, wherein said step of applying electric charges is performed by applying electric charges to both substrate parts before the substrate parts are brought into contact with the adhesive.

20. The method according to claim 1, wherein said step of applying electric charges is performed by applying electric charges to a surface of a substrate part which faces the adhesive.

21. The method according to claim 1, wherein said step of applying electric charges is performed by applying electric charges to a surface of a substrate part facing away from the adhesive.

22. The method according to claim 21, wherein the charges are applied before or after application of the adhesive to a substrate part.

23. The method according to claim 10, wherein said step of applying electric charges is performed by applying electric charges to at least one of the substrate parts, and said method further comprises rotating that substrate part on a rotary table relative to the charging means during said step of applying electric charges.

24. The method according to claim 5, wherein the adhesive is dispensed onto one of the substrate parts by an outlet nozzle and the adhesive is grounded or charged at the outlet nozzle.

25. The method according to claim 1, wherein the substrate parts are halves of a DVD.

26. Use of the method according to claim 1, wherein the optical data carrier has more than two substrate parts which are connected together with the adhesive.

* * * * *

(12) EX PARTE REEXAMINATION CERTIFICATE (6330th)
United States Patent
Gerigk et al.

(10) Number: US 6,261,403 C1
(45) Certificate Issued: Jul. 29, 2008

(54) METHOD FOR PREVENTING BUBBLES OR SMALL BUBBLES WHEN CONNECTING SUBSTRATE PARTS OF OPTICAL DATA CARRIERS BY MEANS OF AN ADHESIVE

(75) Inventors: Reinhard Gerigk, Gelnhausen (DE); Eggo Sichmann, Gelnhausen (DE); Michael Muecke, Karben (DE)

(73) Assignee: Singulus Technologies AG, Alzenau (DE)

Reexamination Request:
No. 90/007,805, Nov. 16, 2005

Reexamination Certificate for:
Patent No.: 6,261,403
Issued: Jul. 17, 2001
Appl. No.: 09/433,351
Filed: Nov. 4, 1999

(51) Int. Cl.
*B29C 65/00* (2006.01)
*B29C 65/48* (2006.01)
*B29C 65/52* (2006.01)
*C09J 5/02* (2006.01)
*G11B 7/26* (2006.01)

(52) U.S. Cl. ............... 156/272.2; 156/272.6; 156/273.1; 427/458; 427/532

(58) Field of Classification Search .................. None
See application file for complete search history.

(56) References Cited

U.S. PATENT DOCUMENTS

| | | | | |
|---|---|---|---|---|
| 4,054,635 A | * | 10/1977 | Schlesinger et al. | 264/219 |
| 4,682,321 A | * | 7/1987 | Takaoka et al. | 369/284 |
| 4,870,429 A | * | 9/1989 | Fujita et al. | 346/137 |
| 4,965,118 A | * | 10/1990 | Kodera et al. | 428/137 |
| 5,149,607 A | * | 9/1992 | De Graaf et al. | 430/17 |
| 5,509,991 A | * | 4/1996 | Choi | 156/245 |
| 5,824,385 A | * | 10/1998 | Itoigawa et al. | 428/64.1 |
| 5,843,626 A | * | 12/1998 | Ohta et al. | 430/320 |
| 5,946,286 A | * | 8/1999 | Bahns | 369/275.3 |
| 6,009,070 A | * | 12/1999 | Higuchi et al. | 369/275.1 |
| 6,042,684 A | | 3/2000 | Ohman | 156/285 |
| RE36,806 E | * | 8/2000 | Landin et al. | 428/64.1 |
| 6,251,561 B1 | * | 6/2001 | Kawai et al. | 430/270.11 |

FOREIGN PATENT DOCUMENTS

| | | | |
|---|---|---|---|
| JP | 6123533 | | 10/1986 |
| JP | 361242355 A | * | 10/1986 |
| JP | 62-42347 | * | 2/1987 |
| JP | 408194972 A | * | 7/1996 |
| JP | 10-188367 | * | 7/1998 |
| JP | 410214439 A | * | 8/1998 |

OTHER PUBLICATIONS

Patent Office's translation of 61–235133 (Umehara).*

* cited by examiner

*Primary Examiner*—Kiley Stoner

(57) ABSTRACT

A method of preventing bubbles or small bubbles when connecting substrate parts of optical data carriers by means of an adhesive. At least one of the substrate parts and/or the adhesive is provided with electric charges.

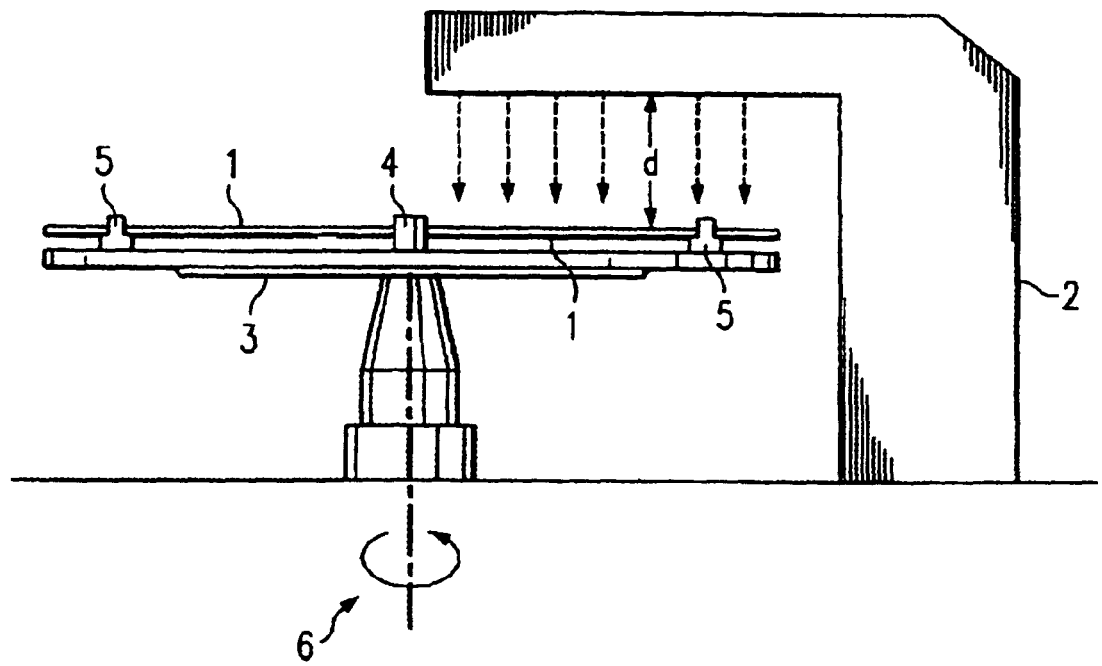

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 14 is cancelled.

Claims 1–3, 9, 10, 16, 18, 19, 23 and 24 are determined to be patentable as amended.

Claims 4, 5, 6, 7, 8, 11, 12, 13, 15, 17, 20, 21, 22, 25 and 26, dependent on an amended claim, are determined to be patentable.

New claims 27–29 are added and determined to be patentable.

1. A method of preventing bubbles from being present between substrate parts of an optical data carrier, which substrate parts are connected together by means of an adhesive, said method comprising applying electric charges to at least one of the substrate parts or the adhesive, *wherein before said step of applying, the adhesive has an electric charge with a first polarity, said step of applying electric charges is performed before or after the adhesive has been applied to the substrate parts.*

2. The method according to claim 1, wherein [before said step of applying, the adhesive has an electric charge with a first polarity, said step of applying electric charges is perfomed before or after the adhesive has been applied to the substrate parts, and] the electric charges applied in said applying step have a polarity opposite to the first polarity.

3. The method according to claim 1, wherein [before said step of applying, the adhesive has an electric charge with a first polarity, said step of applying electric charges is performed before or after the adhesive has been applied to the substrate parts, and] the electric charges applied in said applying step have the first polarity.

9. [The] *A* method [according to claim 1] *of preventing bubbles from being present between substrate parts of an optical data carrier, which substrate parts are connected together by means of an adhesive, said method comprising applying electric charges to at least one of the substrate parts or the adhesive,* wherein said step of applying electric charges is performed by effecting charge separation by means of friction.

10. [The] *A* method [according to claim 1] *of preventing bubbles from being present between substrate parts of an optical data carrier, which substrate parts are connected together by means of an adhesive, said method comprising applying electric charges to at least one of the substrate parts of the adhesive,* wherein said step of applying electric charges is performed by a charging means *and wherein a substrate part is rotated below the charging means and the charging means is stationary during said step of applying electric charges.*

16. [The] *A* method [according to claim 1] *of preventing bubbles from being present between substrate parts of an optical data carrier, which substrate parts are connected together by means of an adhesive, said method comprising applying electric charges to at least one of the substrate parts or the adhesive,* wherein said step of applying electric charges is performed to charge a substrate part to achieve a homogeneous charge distribution.

18. [The] *A* method [according to claim 1] *of preventing bubbles from being present between substrate parts of an optical data carrier, which substrate parts are connected together by means of an adhesive, said method comprising applying electric charges to at least one of the substrate parts or the adhesive,* wherein one of the substrate parts is coated with an adhesive before the substrate parts are connected together and said step of applying electric charges is performed by applying electric charges to the other one of the substrate parts before the substrate parts are connected together.

19. [The] *A* method [according to claim 1] *of preventing bubbles from being present between substrate parts of an optical data carrier, which substrate parts are connected together by means of an adhesive, said method comprising applying electric charges to at least one of the substrate parts or the adhesive,* wherein said step of applying electric charges is performed by applying electric charges to both substrate parts before the substrate parts are brought into contact with the adhesive.

23. [The method according to claim 10,] *A method of preventing bubbles from being present between substrate parts of an optical data carrier, which substrate parts are connected together by means of an adhesive, said method comprising applying electric charges to at least one of the substrate parts or the adhesive, wherein said step of applying electric charges is performed by a charging means and* wherein said step of applying electric charges is performed by applying electric charges to at least one of the substrate parts, and said method further comprises rotating [that] *said at least one* substrate part on a rotary table relative to the charging means during said step of applying electric charges.

24. [The] *A* method [according to claim 5] *of preventing bubbles from being present between substrate parts of an optical data carrier, which substrate parts are connected together by means of an adhesive, said method comprising applying electric charges to at least one of the substrate parts or the adhesive,* wherein the adhesive is dispensed onto one of the substrate parts by an outlet nozzle and the adhesive is grounded or charged at the outlet nozzle.

*27. The method according to claim 24, wherein the adhesive is positively electrically charged.*

*28. The method according to claim 24, wherein the adhesive is negatively electrically charged.*

*29. The method according to claim 24, wherein the adhesive is electrically uncharged.*

\* \* \* \* \*